US012729126B2

(12) United States Patent
Chen et al.

(10) Patent No.: US 12,729,126 B2
(45) Date of Patent: Sep. 8, 2026

(54) SILICATE MATERIAL ZEO-2 AND SILICATE MOLECULAR SIEVE ZEO-3 AND SYNTHESIS METHOD THEREFOR AND USE THEREOF

(71) Applicant: JILIN PROVINCE JNOBEL SCI-TECH INNOVATION CO., LTD, Changchun (CN)

(72) Inventors: Feijian Chen, Hefei (CN); Jian Li, Hefei (CN); Zihao Gao, Hefei (CN); Qingfang Lin, Hefei (CN); Cong Lin, Hefei (CN)

(73) Assignee: JILIN PROVINCE JNOBEL SCI-TECH INNOVATION CO., LTD, Changchun (CN)

( * ) Notice: Subject to any disclaimer, the term of this patent is extended or adjusted under 35 U.S.C. 154(b) by 307 days.

(21) Appl. No.: 18/579,275

(22) PCT Filed: Jun. 20, 2022

(86) PCT No.: PCT/CN2022/099805

§ 371 (c)(1),
(2) Date: Jan. 12, 2024

(87) PCT Pub. No.: WO2023/284491

PCT Pub. Date: Jan. 19, 2023

(65) Prior Publication Data

US 2024/0343592 A1 Oct. 17, 2024

(30) Foreign Application Priority Data

Jul. 16, 2021 (CN) ......................... 202110806648.8

(51) Int. Cl.
*C01B 39/48* (2006.01)
*B01J 6/00* (2006.01)
(Continued)

(52) U.S. Cl.
CPC ............... *C01B 39/48* (2013.01); *B01J 6/001* (2013.01); *B01J 20/186* (2013.01); *B01J 20/28* (2013.01);
(Continued)

(58) Field of Classification Search
CPC ....... C01B 39/48; C01B 37/005; C01B 37/02; C01B 39/04; C01B 33/12; C01B 39/06;
(Continued)

(56) References Cited

U.S. PATENT DOCUMENTS 2,882,243 A 4/1959 Milton
3,130,007 A 4/1964 Breck
(Continued)

FOREIGN PATENT DOCUMENTS

CN 101696019 A 4/2010
CN 105217651 A 1/2016
(Continued)

OTHER PUBLICATIONS

Machine translation of CN 107934982 A (Year: 2018).*
(Continued)

*Primary Examiner* — Coris Fung
*Assistant Examiner* — Remy Frederic Lalisse
(74) *Attorney, Agent, or Firm* — Medler Ferro Woodhouse & Mills PLLC

(57) ABSTRACT

The present invention relates to a one-dimensional silicate material ZEO-2 with a novel structure and a three-dimensional silicate molecular sieve ZEO-3 obtained by roasting ZEO-2 and a synthesis method therefor and a use thereof. The X-ray powder diffraction characteristics and crystal structures of the two silicate materials are represented. The one-dimensional silicate ZEO-2 can be synthesized by a simple method. The molecular sieve ZEO-3 can be obtained by calcining the one-dimensional silicate ZEO-2 to cause
(Continued)

topological condensation. ZEO-2 can be used as a silicon source or a precursor in the synthesis of a novel molecular sieve. The molecular sieve ZEO-3 has good thermal stability and can be used as an adsorbent or a catalyst.

9 Claims, 4 Drawing Sheets

(51) Int. Cl.

| | |
|---|---|
| ***B01J 20/18*** | (2006.01) |
| ***B01J 20/28*** | (2006.01) |
| ***B01J 20/30*** | (2006.01) |
| ***B01J 20/32*** | (2006.01) |
| ***B01J 29/70*** | (2006.01) |
| ***B01J 35/30*** | (2024.01) |
| ***B01J 35/50*** | (2024.01) |
| ***B01J 37/00*** | (2006.01) |
| ***B01J 37/04*** | (2006.01) |
| ***B01J 37/06*** | (2006.01) |
| ***B01J 37/08*** | (2006.01) |

(52) U.S. Cl.

CPC ......... *B01J 20/305* (2013.01); *B01J 20/3078* (2013.01); *B01J 20/3206* (2013.01); *B01J 29/70* (2013.01); *B01J 35/30* (2024.01); *B01J 35/50* (2024.01); *B01J 37/0018* (2013.01); *B01J 37/04* (2013.01); *B01J 37/06* (2013.01); *B01J 37/08* (2013.01); *B01J 2235/15* (2024.01)

(58) Field of Classification Search

CPC ...... B01J 2235/15; B01J 29/89; B01J 20/186; B01J 20/28; B01J 20/305; B01J 20/3206; B01J 29/70; B01J 20/10; B01J 2235/30; B01J 20/18; B01J 20/2803; B01J 29/04; C01P 2002/72; C01P 2004/03

USPC ........................................................... 502/64

See application file for complete search history.

(56) References Cited

U.S. PATENT DOCUMENTS

| | | | |
|---|---|---|---|
| 3,709,979 | A | 1/1973 | Chu |
| 3,832,449 | A | 8/1974 | Rosinski et al. |
| 4,016,245 | A | 4/1977 | Plank et al. |
| 4,076,842 | A | 2/1978 | Plank et al. |
| 4,954,325 | A | 9/1990 | Rubin et al. |
| 2008/0107986 | A1 | 5/2008 | Michel et al. |
| 2015/0353368 | A1 | 12/2015 | Zones et al. |
| 2016/0122193 | A1 | 5/2016 | Lai et al. |
| 2020/0010331 | A1 | 1/2020 | Kunkes et al. |

FOREIGN PATENT DOCUMENTS

| | | | | | |
|---|---|---|---|---|---|
| CN | 104370296 | A | | 5/2016 | |
| CN | 107892309 | A | | 4/2018 | |
| CN | 107934982 | A | * | 4/2018 | ............ C01B 39/04 |
| CN | 105728034 | A | | 9/2018 | |
| CN | 111871451 | A | | 11/2020 | |
| EP | 4253321 | A1 | | 10/2023 | |
| JP | 2007-537120 | A | | 12/2007 | |
| JP | 2020-500827 | A | | 1/2020 | |
| WO | 96/18577 | A1 | | 10/1997 | |
| WO | WO-2017185820 | A1 | * | 11/2017 | ............ C01B 37/02 |

OTHER PUBLICATIONS

Machine translation of WO 2017185820 A1 (Year: 2017).*

Dorset et al., "P-derived organic cations as structure-directing agents: synthesis of a high-silica zeolite (ITQ-27) with a two-dimensional 12-ring channel system," *Journal of the American Chemical Society* 128(27): 8862-8867 (2006).

Li, Jian et al., "A 3D Extra-Large-Pore Zeolite Enabled by 1D-to-3D Topotactic Condensation of a Chain Silicate," *Science*, 379(6629): 283-287 (2023).

PCT/CN2022/099805 International Search Report, Issued Sep. 8, 2022.

PCT/CN2022/099805 Written Opinion of the International Searching Authority, Issued Sep. 9, 2022.

CN 202110806648.8, First Office Action, Issued by the State Intellectual Property Office of People's Republic of China on Sep. 2, 2023.

CN 202110806648.8, Search Report issued with First Office Action, Issued by the State Intellectual Property Office of People's Republic of China on Sep. 2, 2023.

International Zeolite Association, Database of Zeolite Structures, "Explanatory Notes—Structures". Retrieved from: https://europe.iza-structure.org/IZA-SC/DatabaseHelp_Structures.html#CS.

Eliášová et al., "The ADOR mechanism for the synthesis of new zeolites," Chem. Soc. Rev. 44, 7177-7206 (2015).

Roth et al., "Two-Dimensional Zeolites: Current Status and Perspectives," Chem. Rev. 114, 4807-4837 (2014).

CN 202110806648.8, Notification of Grant of Patent Right; Issued by the State Intellectual Property Office of People's Republic of China on Oct. 7, 2023.

* cited by examiner

SILICATE MATERIAL ZEO-2 AND SILICATE MOLECULAR SIEVE ZEO-3 AND SYNTHESIS METHOD THEREFOR AND USE THEREOF

TECHNICAL FIELD

The present invention relates to the technical field of inorganic synthesis and its chemical application, specifically, to a one-dimensional silicate material ZEO-2 with a novel structure and a three-dimensional silicate molecular sieve ZEO-3 obtained by calcining it, and further to their synthesis methods and uses.

BACKGROUND ART

In industry, microporous silicate materials are widely used in fields such as catalysis and adsorption separation. Microporous silicate materials have a high specific surface area, unblocked channel structure, and excellent thermal stability, so they are good catalytic material, catalyst carrier, or adsorption separation material.

Crystalline microporous silicate material is also called as zeolite molecular sieve. Its basic framework structure is constituted by $TO_4$ ($SiO_4$, $AlO_4$, etc.) units. In the structure, $TO_4$ shares oxygen atoms in a tetrahedron. The charge balance of the framework tetrahedrons such as $AlO_4$ is maintained by cations such as $H^+$, $Na^+$ and $K^+$ in the channels. There are abundant channel systems with specific channel diameter in the zeolite molecular sieve structure. These channels are interlaced with each other and can form different three-dimensional network structures. According to the channel size, microporous zeolite molecular sieves can be divided into small pore, medium pore, large pore, and extra-large pore molecular sieves, corresponding to the number of the $TO_4$ of the window ring equal or less than 8-membered ring, equal or less than 10-membered ring, equal or less than 12-membered ring and greater than 12-membered ring. On the one hand, it is precisely because of the above channel structure that zeolite molecular sieve has good catalytic activity, good shape selectivity and good selective adsorption performance for a variety of organic reactions; and on the other hand, due to structural differences, zeolite molecular sieve materials of different channel structures differ greatly in properties such as catalysis and adsorption separation, as well as in the basic physical parameters used to characterize the materials, such as morphology, specific surface area, pore size distribution and pore volume.

At present, molecular sieve materials that have been successfully used in industry usually have a channel size below 1 nm, which greatly limits the size and shape of the substrate molecules in adsorption, separation and catalysis processes. The development and acquisition of stable extra-large pore molecular sieves having a channel diameter of 1 nm to 2 nm and a channel ring of greater than 12-membered ring have great application value in the fields of petrochemistry, fine chemicals and life science.

A zeolite molecular sieve with a specific structure needs to be further distinguished by powder X-ray diffraction. Due to different crystal structures, different molecular sieves have different channel structures, and will obtain completely different diffraction patterns in a powder X-ray diffraction test. Existing molecular sieves, such as type A zeolite molecular sieve (see U.S. Pat. No. 2,882,243A), type Y zeolite molecular sieve (see U.S. Pat. No. 3,130,007A), ZSM-11 zeolite molecular sieve (see U.S. Pat. No. 3,709,979A), ZSM-12 zeolite molecular sieve (see U.S. Pat. No. 3,832,449A), ZSM-23 zeolite molecular sieve (see U.S. Pat. No. 4,076,842A), ZSM-35 zeolite molecular sieve (see U.S. Pat. No. 4,016,245A), MCM-42 zeolite molecular sieve (see U.S. Pat. No. 4,954,325A), all have powder X-ray diffraction patterns with their own characteristics.

In addition, the uniqueness of molecular sieve materials with different structures can also be reflected in their unique topological properties. According to the definition and interpretation by the International Zeolite Association, Structure Commission, for a specific molecular sieve topological framework, the coordination sequences and vertex symbols are unique when combined, that is, they can be used to clearly distinguish different molecular sieve framework structures (See the official website of the International Zeolite Association: https://europe.iza-structure.org/IZA-SC/DatabaseHelp_Structures.htm #CS).

Typical development of a silicate zeolite molecular sieve is to mix a silicon source, heteroatoms (Al, B, Ti, Sn, Ge, etc.), an organic template, water and a mineralizing agent for high-temperature crystallization, followed by calcination at a high temperature to remove the organic template. With the development of zeolite molecular sieve synthesis technology, using a known silicate material as precursor and obtaining a microporous silicate zeolite molecular sieve through post-treatment has become another important way to develop a molecular sieve material with novel structure (see Chem. Soc. Rev., 2015, 44, 7177-7206; CN105728034A).

Currently, the precursors that can be used to synthesize a microporous silicate zeolite molecular sieve with novel structure all have a two-dimensional layered structure, which is characterized by hydrogen bonds or van der Waals interactions between layers and thus has untight bonding, they show structural diversity and fabricability, and can be used for structural post-treatment and modification, such as swelling, pillaring, peeling or silicon insertion for hole expansion (see Chem. Rev., 2014, 114, 4807-4837). The preparation of a layered silicate precursor can be achieved by direct synthesis via hydrothermal method or post-treatment of a three-dimensional silicate zeolite material (mainly silicon germanate zeolite).

There are two methods to obtain a microporous silicate zeolite molecular sieve from a layered silicate precursor. One method is to calcine a layered precursor to remove the organic template, and dehydrate and condensate the interlayer terminal silanol groups to form a zeolite molecular sieve material with three-dimensional structure. For example, MWW and FER zeolites can be directly synthesized by respectively calcining their layered precursors MCM-22P and PREFER (see U.S. Pat. No. 4,954,325A; Micro. Mater. 1 996, 6, 259-271). Another method is silicon insertion for pore enlargement, which uses an organosilane reagent as bridging group and inserts it into the layers of a layered silicate precursor in an orderly and controllable manner, thereby increasing the interlayer spacing between the original layers and connect the layers, wherein the organic component can be removed by subsequent calcination. This method realizes the transformation from two-dimensional layered structure to three-dimensional microporous structure, improves the stability and crystallinity of the molecular sieve framework structure, and further the multiple options of organosilane reagents make it possible for adjusting and controlling the channel size, shape, openness and functionality of the zeolite molecular sieve products, thereby greatly expanding the structural chemistry of zeolite molecular sieves and their potential applications in heterogeneous catalytic reactions involving macromolecules (see J. Am. Chem. Soc., 2008, 130, 8178-8187; Angew. Chem. Int. Ed., 2018, 130, 9659-9663).

It is evident that starting from silicate precursors, the design of structure and function can be realized. It is a very important and unique method for the synthesis of microporous silicate zeolite molecular sieves. However, currently the silicate precursors that can be used for such methods are only limited to a small amount of layered structures, and there is yet no precedent for the synthesis of a silicate zeolite molecular sieve from a one-dimensional chain precursor.

Therefore, developing a novel silicate precursor material, especially a precursor with one-dimensional chain structure, and applying it to the development of a novel zeolite molecular sieve will be of great theoretical significance and important application value for the synthesis, structure and application in the field of zeolite molecular sieves.

DISCLOSURE OF THE INVENTION

In a first aspect, the present invention provides a novel silicate material with one-dimensional chain structure ZEO-2, and a three-dimensional silicate molecular sieve ZEO-3 obtained by calcining ZEO-2. They are two novel silicate materials that are germanium free, of pure silicon, and have ultra-high thermal stability and hydrothermal stability. They are not only of very important practical application value, but also of very important theoretical significance for enriching the molecular sieve structure family.

The chains of the one-dimensional chain silicate material ZEO-2 are separated by a template with positive charges. There is no chemical bond between the template and the silicate chain. The chain structure only has silicon hydroxyl groups and infinitely extended silicon-oxygen-silicon bonds. Although organic matter is present in the ZEO-2 material, it does not form bonds or have strong interactions with the main body of the ZEO-2 material, i.e., the one-dimensional chain silicate. The molecular sieve ZEO-3 obtained after calcination is a three-dimensional extra-large pore silicate molecular sieve material. All organic matter is removed during the calcination process. The one-dimensional chain silicate structure is topologically condensed to form a three-dimensional molecular sieve, and a small amount of inorganic matter therein can be removed by washing with water. The framework of ZEO-3 only has infinitely extended silicon-oxygen-silicon bonds. The silicate material ZEO-2 with one-dimensional chain structure of the present invention has the powder X-ray diffraction characteristics shown in Table 1:

TABLE 1

| Interplanar spacing range (Å) | Relative intensity $I/I_0 \times 100$ |
|---|---|
| 16.246 ± 1.052 | vs |
| 12.282 ± 0.736 | m-s |
| 10.773 ± 0.737 | w |
| 9.706 ± 0.675 | w |
| 8.911 ± 0.671 | w |
| 8.158 ± 0.354 | mw |
| 7.476 ± 0.193 | w |
| 7.115 ± 0.101 | w |
| 6.891 ± 0.085 | w-mw |
| 6.556 ± 0.071 | w |
| 6.248 ± 0.053 | w |
| 6.136 ± 0.093 | w-mw |
| 5.786 ± 0.071 | w |
| 5.493 ± 0.063 | w-mw |
| 5.378 ± 0.061 | w-mw |
| 5.292 ± 0.037 | w |
| 5.024 ± 0.063 | w |

TABLE 1-continued

| Interplanar spacing range (Å) | Relative intensity $I/I_0 \times 100$ |
|---|---|
| 4.494 ± 0.043 | w |
| 4.771 ± 0.091 | w |
| 4.601 ± 0.039 | w |
| 4.284 ± 0.042 | w-mw |
| 4.072 ± 0.103 | vs |
| 3.914 ± 0.035 | w |
| 3.855 ± 0.027 | w |
| 3.806 ± 0.031 | w |
| 3.735 ± 0.029 | w |
| 3.642 ± 0.035 | w |
| 3.575 ± 0.028 | w-mw |
| 3.420 ± 0.040 | w-mw |
| 3.368 ± 0.022 | w-mw |
| 3.275 ± 0.031 | w |
| 3.073 ± 0.026 | w |
| 2.967 ± 0.027 | w |
| 2.833 ± 0.028 | w |
| 2.597 ± 0.020 | w |
| 2.448 ± 0.013 | w |

In the above data, w, mw, m, s and vs represent diffraction peak intensity, w is weak, mw is moderately weak, m is medium, s is strong, vs is very strong, which are known to those skilled in the art. Generally speaking, w is less than 10, mw is 10-20, m is 20-40, s is 40-70, and vs is greater than 70.

The silicate molecular sieve of three-dimensional extra-large pore structure ZEO-3 of the present invention has the powder X-ray diffraction characteristics shown in Table 2:

TABLE 2

| Interplanar spacing range (Å) | Relative intensity $I/I_0 \times 100$ |
|---|---|
| 14.669 ± 1.055 | vs |
| 11.447 ± 0.486 | m-vs |
| 9.049 ± 0.253 | m-s |
| 8.423 ± 0.168 | w |
| 7.403 ± 0.194 | w |
| 6.843 ± 0.132 | w |
| 6.458 ± 0.123 | w |
| 5.965 ± 0.073 | w |
| 5.738 ± 0.122 | w |
| 4.994 ± 0.10 | w-mw |
| 4.901 ± 0.075 | w-mw |
| 4.697 ± 0.078 | w |
| 4.519 ± 0.079 | w-mw |
| 4.360 ± 0.047 | w |
| 4.194 ± 0.057 | w |
| 4.058 ± 0.070 | w |
| 3.970 ± 0.045 | w |
| 3.785 ± 0.086 | w |
| 3.673 ± 0.073 | w-mw |
| 3.623 ± 0.075 | w-mw |
| 3.548 ± 0.048 | w |
| 3.419 ± 0.042 | w |
| 3.376 ± 0.045 | w |
| 3.218 ± 0.032 | w |
| 3.171 ± 0.031 | w |
| 3.029 ± 0.041 | w |
| 2.977 ± 0.024 | w |
| 2.870 ± 0.28 | w |
| 2.660 ± 0.29 | w |
| 2.497 ± 0.033 | w |

In the above data, w, mw, m, s and vs represent diffraction peak intensity, w is weak, mw is moderately weak, m is medium, s is strong, vs is very strong, which are known to those skilled in the art. Generally speaking, w is less than 10, mw is 10-20, m is 20-40, s is 40-70, and vs is greater than 70.

In a second aspect, the present invention further provides a method for preparing the above one-dimensional silicate material ZEO-2 and three-dimensional extra-large pore molecular sieve ZEO-3.

The method for the synthesis of the silicate material ZEO-2 comprises:

(1) mixing a silicon source, an organic template and water to obtain a mixture;

(2) crystallizing the mixture to obtain the one-dimensional silicate material ZEO-2;

wherein the organic template has a tetrahedral spatial configuration represented by the following general formula:

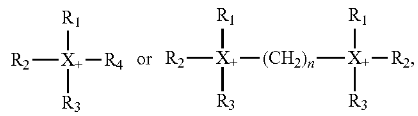

wherein $R_1$ is cyclohexyl; $R_2$ and $R_3$ are phenyl or cyclohexyl; $R_4$ is $C_{1-8}$ alkyl, preferably $C_{1-4}$ alkyl, more preferably $C_{1-2}$ alkyl; n has a value of 3-8, preferably 5-7, more preferably 6; X is phosphorus or nitrogen, preferably phosphorus.

The method for the synthesis of the molecular sieve ZEO-3 comprises: calcining the silicate material ZEO-2 of the present invention to remove the template and cause topological condensation of the framework structure, to thereby obtain the three-dimensional extra-large pore zeolite molecular sieve ZEO-3 of the present invention.

In a third aspect, the present invention further provides a molecular sieve composition, which comprises the three-dimensional extra-large pore silicate molecular sieve ZEO-3 of the present invention, and a binder.

In a fourth aspect, the one-dimensional silicate material ZEO-2 of the present invention can be used as a silicon source or precursor in a molecular sieve synthesis; the three-dimensional extra-large silicate molecular sieve ZEO-3 can be used as a catalyst or adsorbent.

DETAILED DESCRIPTION OF THE INVENTION

Figure 6:
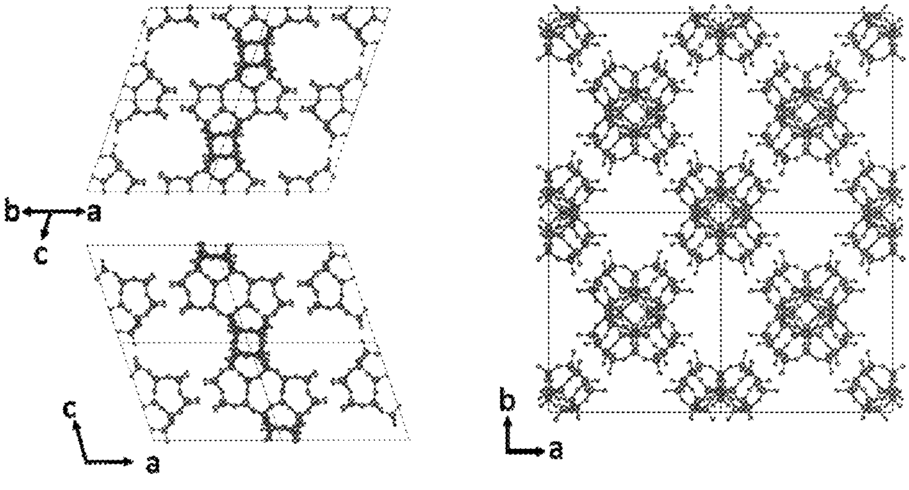
FIG. 6 is a diagram of the framework structure of the silicate material ZEO-2 after removing the organic template.

The crystal structure of the inorganic framework of the silicate material ZEO-2 of the present invention is shown in FIG. 6. The crystal structure of the silicate material ZEO-2 has a regular, long-range ordered, one-dimensional silica chain structure that extends infinitely along the c-axis direction.

Figure 7:
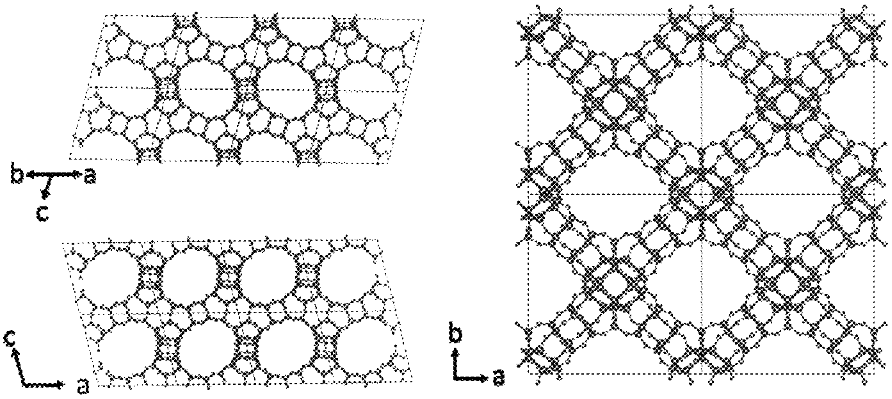
FIG. 7 is a diagram of the channel structure of extra-large pore molecular sieve ZEO-3.

The crystal structure of the molecular sieve ZEO-3 of the present invention is shown in FIG. 7. As can be seen from FIG. 7, there are penetrating 14-membered ring channels in both the (a+b)-axis direction and the (a-b)-axis direction of the ZEO-3 crystal structure. In addition, there are 16-membered ring channels in the c-axis direction of the ZEO-3 crystal structure. Therefore, the structure is described as a three-dimensional intersecting channel system of 16×14×14-membered rings.

The molecular sieve ZEO-3 of the present invention is subjected to structural analysis and topology analysis. The molecular sieve framework structure has 11 topologically independent T atoms, 20 topologically different edges (lines constituted by adjacent T atom and T atom), 16 topologically different planes (planes constituted by T atoms), and 8 topologically different building blocks constituted by T atoms. Among them, the topological properties (including coordination sequences and vertex symbols) of the 11 topologically independent T atoms of the framework structure of the molecular sieve ZEO-3 are shown in Table 3.

TABLE 3

| | N1 | N2 | N3 | N4 | N5 | N6 | N7 | N8 | N9 | N10 | N11 | N12 | VS |
|---|---|---|---|---|---|---|---|---|---|---|---|---|---|
| T1 | 4 | 11 | 18 | 27 | 34 | 54 | 81 | 113 | 140 | 159 | 181 | 224 | 4.5(2).5.5.5.6 |
| T2 | 4 | 10 | 19 | 27 | 39 | 53 | 80 | 109 | 139 | 166 | 192 | 224 | 4.6.4.14.5.5 |
| T3 | 4 | 8 | 15 | 26 | 39 | 55 | 73 | 102 | 135 | 169 | 194 | 227 | 4.4.4.5.4.14(5) |
| T4 | 4 | 10 | 19 | 28 | 38 | 54 | 77 | 111 | 140 | 166 | 191 | 224 | 4.6.4.14(5).5.5 |
| T5 | 4 | 11 | 18 | 25 | 36 | 54 | 85 | 110 | 134 | 157 | 188 | 230 | 4.5(2).5.5.5.6 |
| T6 | 4 | 12 | 17 | 25 | 38 | 58 | 80 | 113 | 135 | 156 | 192 | 231 | 5.5.5.6.5(2).14(3) |
| T7 | 4 | 8 | 15 | 26 | 38 | 54 | 76 | 105 | 131 | 165 | 196 | 228 | 4.4.4.5.4.14 |
| T8 | 4 | 9 | 15 | 24 | 39 | 57 | 80 | 103 | 127 | 156 | 204 | 240 | 4.5.4.5.4.14 |
| T9 | 4 | 12 | 15 | 22 | 40 | 62 | 84 | 107 | 122 | 152 | 200 | 250 | 5.5.5.5.5(2).16(9) |
| 10 | 4 | 12 | 19 | 28 | 36 | 52 | 82 | 115 | 144 | 162 | 186 | 218 | 5.5.5(2).14(6).6.6 |
| T11 | 4 | 9 | 15 | 25 | 40 | 55 | 77 | 102 | 134 | 163 | 196 | 229 | 4.5.4.5.4.14(5) |

T1 to T11 represent the 11 topologically different T atoms of the framework structure of the extra-large pore molecular sieve ZEO-3 of the present invention; N1 to N12 represent the coordination sequences of these T atoms from the first layer to the twelfth layer. Due to the different order of naming of T atoms, the 11 topologically independent T atoms named in a different order may not correspond one-to-one to the coordination sequences and vertex symbols of the T atoms in the order in this table, but the structures belonging to the ZEO-3 topology all include and only include the coordination sequences and vertex symbols of the 11 topologically independent T atoms in this table, and the coordination sequences and vertex symbols correspond one-to-one.

The silicate ZEO-2 of the present invention has a chemical composition $SiO_{2.2}H_{0.4}\cdot(OSDA)_y$, where OSDA is an organic template, and y=0.075-0.125.

The extra-large pore silicate molecular sieve ZEO-3 of the present invention has a chemical composition of $SiO_2$.

In the method for the synthesis of the silicate material ZEO-2 of the present invention, specific examples of the organic templates include but are not limited to any one or more shown in Table 4:

TABLE 4

| No. | Structural diagram | No. | Structural diagram |
|---|---|---|---|
| 1 | 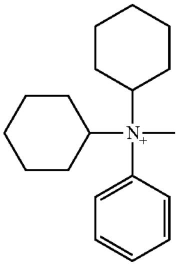 | 6 | 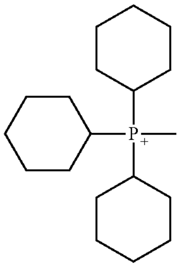 |
| 2 | 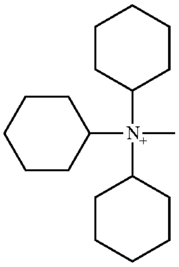 | 7 | 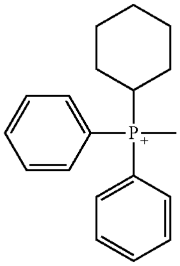 |
| 3 | 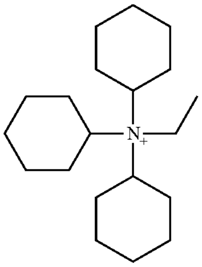 | 8 | 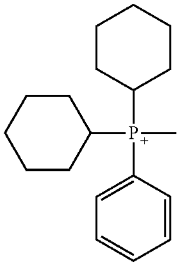 |
| 4 | 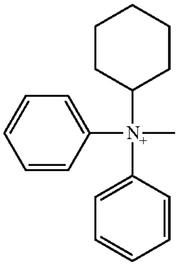 | 9 | 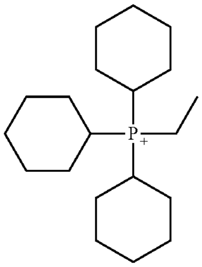 |

TABLE 4-continued

| No. | Structural diagram | No. | Structural diagram |
|---|---|---|---|
| 5 | 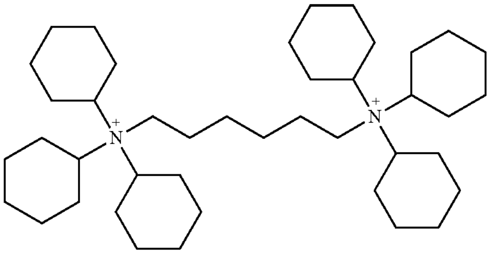 | 10 | 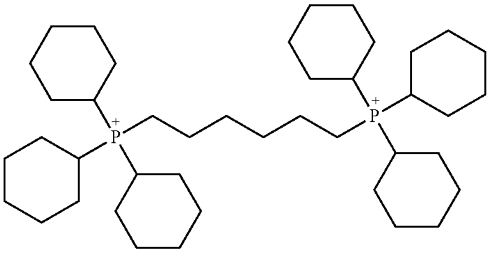 |

The organic template is preferably any one or more selected from the group consisting of template 1, template 6, template 8 and template 10, more preferably any one or more selected from the group consisting of template 6 and template 10.

In the method for the synthesis of the silicate material ZEO-2 of the present invention, step (1) may specifically comprise: under static or dynamic stirring, mixing a silicon source, an organic template and water uniformly in proportion, and forming a reaction gel by the obtained mixture with a chemical composition of $rROH:SiO_2:wH_2O$, wherein R represents the positive charge group of the organic template; the corresponding value intervals of r and w are: r=0.05-5.0, w=1-100; step (2) may specifically comprise: placing the reaction gel under an infrared lamp or in an oven, after the removal of excess solvent, transferring the reaction gel to a stainless steel reaction kettle to react for 1-60 days, preferably 2-45 days, under sealed condition and at a temperature of 80-240° C., preferably 120-220° C., for crystallization; and the method may further comprise: (2) washing, centrifuging, and drying the crystallized product, to obtain the silicate material ZEO-2 product.

In step (1), in the chemical composition $rROH:SiO_2:wH_2O$ of the reaction gel, preferably the corresponding value intervals of r and w are: r=0.1-2.0, w=1-30.

The silicon source can be at least one selected from the group consisting of silicic acid, silica gel, silica sol, tetraalkyl silicate and water glass, preferably water glass, silica sol or tetraethyl orthosilicate.

In the preparation method of the present invention, germanium or germanium-containing compounds are not used.

Before the preparation of the reaction gel, all of the organic cationic templates can be exchanged into hydroxide form via an ion exchange resin, and their concentration is calibrated by 0.1M hydrochloric acid solution for later use, or they may be introduced directly in the form of a chloride salt, a bromide salt or an iodide salt.

Crystallization conditions in step (2) may include, for example: crystallization temperature of 80° C. to 240° C., preferably 120° C. to 220° C., more preferably 140° C. to 210° C.; and crystallization time of 1 to 60 days, preferably 2 to 50 days, more preferably 3 to 45 days.

In step (3), washing, centrifuging and drying can be performed in any manner conventionally known in the art. For example, washing can be performed multiple times with water or ethanol; and drying can be done by oven drying.

In the method for the synthesis of the extra-large pore zeolite molecular sieve ZEO-3 of the present invention, the calcination temperature is 300° C. to 1000° C.

The binder in the molecular sieve composition of the present invention can be any binder known in the art that can be used for catalysts or adsorbents, as long as it does not adversely affect the molecular sieve ZEO-3 of the present invention.

EXAMPLES

In order to illustrate the present invention more clearly, the following examples are provided. These examples do not limit the protection scope of the present invention in any way.

Example 1: Preparation of Template

Template 6 was taken as an example to illustrate the general process for the synthesis of a template. 28.04 g of tricyclohexylphosphine and 150 ml of acetonitrile were mixed in a 250 ml round bottom flask. At normal temperature, 21.29 g of methyl iodide was added dropwise to the mixed liquid. The system reacted for two days under stirring at normal temperature, and the solvent was removed from the reaction mixture by rotary evaporation to obtain a crude product, which was recrystallized with ethanol to obtain 40.55 g of product, with a yield of 96%. The product was characterized by liquid NMR (CDCl3) and electrospray mass spectrometry, and confirmed to be the target compound.

The resulting product was dispersed in 400 ml of deionized water, and the pretreated 717 strong base-type anion exchange resin (manufacturer: Sinopharm Group, China) was used for column exchange to exchange the obtained aqueous solution of template agent 6. An appropriate amount of this solution was weighed, and calibrated with a 0.1 mol/L solution of hydrochloric acid, using phenolphthalein as an indicator. The calibrated structure confirmed an exchange efficiency of iodide salt to hydroxide radical up to 97%.

Example 2: Preparation of Template

Template 10 was taken as an example to illustrate the general process for the synthesis of a template. 28.04 g of tricyclohexylphosphine and 150 ml of acetonitrile were mixed in a 250 ml round bottom flask. 12.20 g of 1,6-dibromohexane was added dropwise to the mixed liquid. The system reacted for two days under stirring and under reflux, and the solvent was removed from the reaction mixture by rotary evaporation to obtain a crude product, which was recrystallized with ethanol to obtain 38.23 g of product, with a yield of 95%. The product was characterized by liquid NMR (D2O) and electrospray mass spectrometry, and confirmed to be the target compound.

The resulting product was dispersed in 400 ml of deionized water, and the pretreated 717 strong base-type anion exchange resin (manufacturer: Sinopharm Group, China) was used for column exchange to exchange the obtained aqueous solution of template agent 10. An appropriate amount of this solution was weighed, and calibrated with a 0.1 mol/L solution of hydrochloric acid, using phenolphthalein as an indicator. The calibrated structure confirmed an exchange efficiency of iodide salt to hydroxide radical up to 96%.

Example 3 Preparation of ZEO-2 and ZEO-3

According to the molar ratio of 0.5 ROH:$SiO_2$:10 $H_2O$, a gel for the synthesis of molecular sieve was prepared by the following general steps: an appropriate amount of the solution of template in Example 1 after exchange was weighed, 4 mmol (0.833 g) of tetraethyl orthosilicate was added therein, and stirred at normal temperature for about two hours so that tetraethyl orthosilicate was completely dissolved, then the mixed gel was placed under an infrared lamp or in an oven at 80° C., to remove the excess solvent. The finally obtained reaction gel was transferred to a 5 ml stainless steel reaction kettle with polytetrafluoroethylene lining, and reacted at 175° C. for 28 days under sealed condition, the product was washed twice with water and twice with ethanol, and oven dried for use. The product was directly subjected to phase identification by X-ray powder diffraction, and was confirmed to be ZEO-2.

An appropriate amount of the sample was calcined in a muffle furnace at 600° C. in an air atmosphere for 2 hours to remove the template, the product was washed with water, centrifuged, and dried. The product was subjected to phase identification by X-ray powder diffraction, and was confirmed to be ZEO-3. EDS elemental analysis showed that it had solicon element and oxygen element and had a molecular formula $SiO_2$.

Example 4 Preparation of ZEO-2 and ZEO-3

According to the molar ratio of 0.3 ROH:$SiO_2$:5 $H_2O$, a gel for the synthesis of molecular sieve was prepared by the following general steps: an appropriate amount of the solution of template in Example 2 after exchange was weighed, 2 mmol (0.417 g) of tetraethyl orthosilicate was added therein, and stirred at normal temperature for about two hours so that tetraethyl orthosilicate was completely dissolved, then the mixed gel was placed under an infrared lamp or in an oven at 80° C., to remove the excess solvent.

The finally obtained reaction gel was transferred to a 5 ml stainless steel reaction kettle with polytetrafluoroethylene lining, and reacted at 175° C. for 30 days under sealed condition, the product was washed twice with water and twice with ethanol, and oven dried for use. The product was directly subjected to phase identification by X-ray powder diffraction, and was confirmed to be ZEO-2.

An appropriate amount of the sample was calcined in a muffle furnace at 600° C. in an air atmosphere for 2 hours to remove the template, the product was washed with water, centrifuged, and dried. The product was subjected to phase identification by X-ray powder diffraction, and was confirmed to be ZEO-3. EDS elemental analysis showed that it had solicon element and oxygen element and had a molecular formula $SiO_2$.

Example 5 Preparation of ZEO-2 and ZEO-3

According to the molar ratio of 0.5 ROH:$SiO_2$:10 $H_2O$, a gel for the synthesis of molecular sieve was prepared by the following general steps: an appropriate amount of the solution of template 8 in Table 6 after exchange was weighed, 1 mmol (0.208 g) of tetraethyl orthosilicate was added therein, and stirred at normal temperature for about two hours so that tetraethyl orthosilicate was completely dissolved, then the mixed gel was placed under an infrared lamp or in an oven at 80° C., to remove the excess solvent. The finally obtained reaction gel was transferred to a 5 ml stainless steel reaction kettle with polytetrafluoroethylene lining, and reacted at 175° C. for 38 days under sealed condition, the product was washed twice with water and twice with ethanol, and oven dried for use. The product was directly subjected to phase identification by X-ray powder diffraction, and was confirmed to be ZEO-2.

An appropriate amount of the sample was calcined in a muffle furnace at 600° C. in an air atmosphere for 2 hours to remove the template, the product was washed with water, centrifuged, and dried. The product was subjected to phase identification by X-ray powder diffraction, and was confirmed to be ZEO-3. EDS elemental analysis showed that it had solicon element and oxygen element and had a molecular formula $SiO_2$.

Example 6 Preparation of ZEO-2 and ZEO-3

According to the molar ratio of 0.5 ROH:$SiO_2$:10 $H_2O$, a gel for the synthesis of molecular sieve was prepared by the following general steps: the solution of template in Example 1 in 6 mmol after exchange was weighed, 12 mmol (2.500 g) of tetraethyl orthosilicate was added therein, and stirred at normal temperature overnight so that tetraethyl orthosilicate was completely hydrolyzed and the hydrolysis product ethanol was volatized, the mixed gel was placed under an infrared lamp or in an oven at 85° C., to remove the excess solvent. The finally obtained reaction gel was transferred to a 30 ml stainless steel reaction kettle with polytetrafluoroethylene lining, and reacted at 190° C. for 30 days under sealed condition, the product was washed twice with water and twice with ethanol, and oven dried for use. The product was directly subjected to phase identification by X-ray powder diffraction, and was confirmed to be ZEO-2. EDS elemental analysis showed that it had silicon, phosphorus, oxygen and carbon elements. Fourier Transform Infrared Spectrum data showed that there was Si—OH bond stretching vibration and this peak was a strong peak, indicating that ZEO-2 was a type of silicate material with silanol groups and had a large content of silanol groups.

An appropriate amount of the sample was calcined in a muffle furnace at 600° C. in an air atmosphere for 2 hours to remove the template, the product was washed with water, centrifuged, and dried. The product was subjected to phase identification by X-ray powder diffraction, and was confirmed to be ZEO-3. EDS elemental analysis showed that it had solicon element and oxygen element only and had a molecular formula $SiO_2$. Fourier Transform Infrared Spectrum data showed that there was no Si—OH bond stretching vibration, and there was Si—O bond stretching vibration only, indicating that ZEO-3 was a type of silicate material without silanol groups and without defects.

Example 7 Structural Analysis

Figure 1:
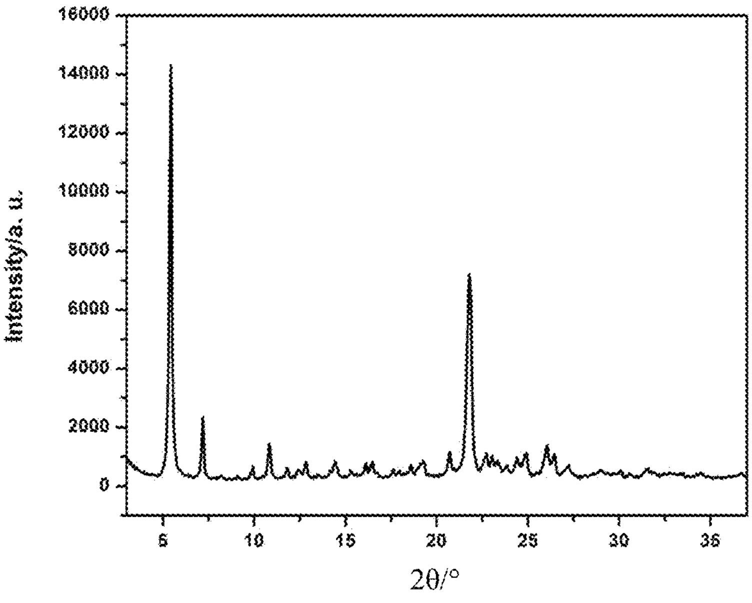
FIG. 1 is an X-ray powder diffraction pattern of the silicate material ZEO-2 of the present invention (the light source is Cu target Kα rays).

The molecular sieves ZEO-2 of Examples 3-6 were subjected to continuous rotation electron diffraction (cRED) test, and the structural analysis results showed that the ZEO-2 molecular sieve structure had monoclinic symmetry with C2/c space group, the unit cell parameters obtained after refinement of the powder X-rays with copper target (Ka) as light source (FIG. 1) were: a=23.539 (9) Å, b=24.744 (9) Å, c=14.398 (9) Å, β=115.19 (9)°.

Figure 2:
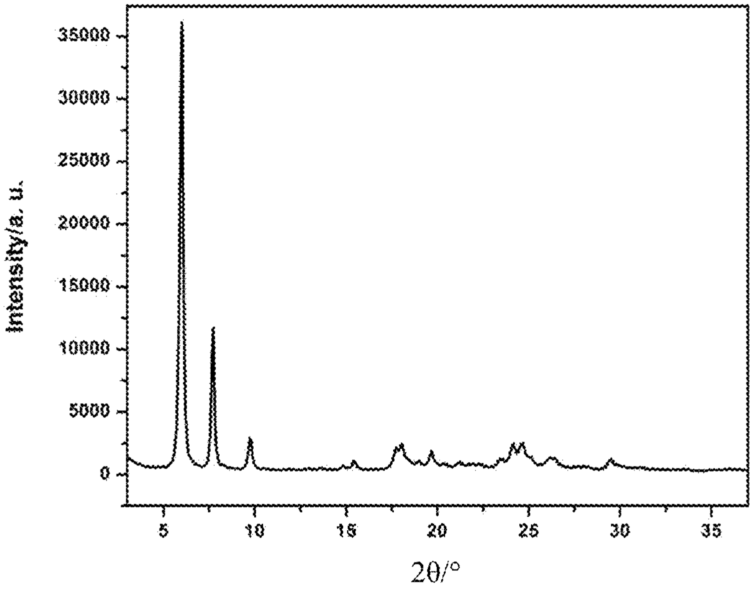
FIG. 2 is an X-ray powder diffraction pattern of the silicate molecular sieve ZEO-3 of the present invention (the light source is Cu target Kα rays).
Figure 3:
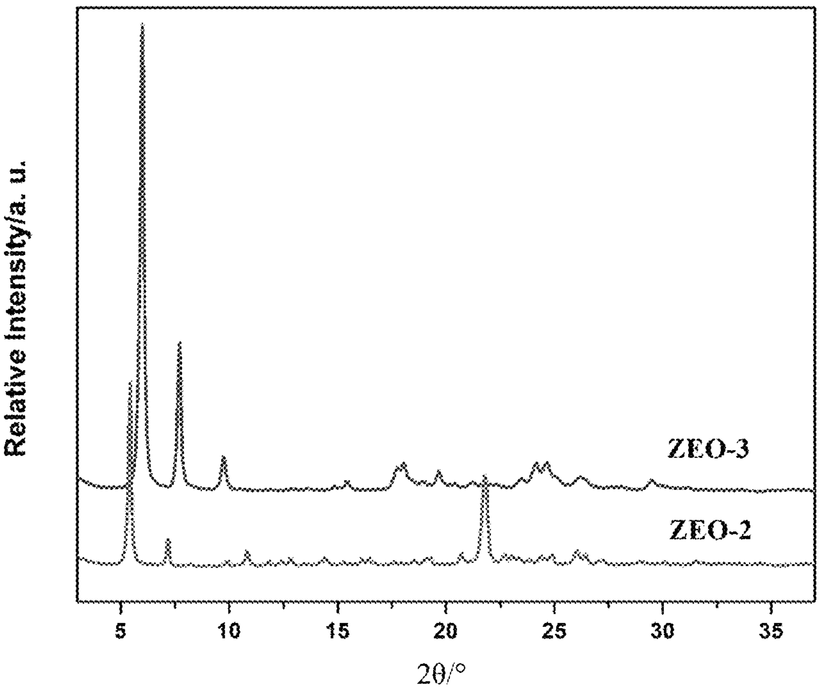
FIG. 3 is a relative intensity comparison of the X-ray powder diffraction patterns of the silicate material ZEO-2 and the silicate molecular sieve ZEO-3 of the present invention.
Figure 4:
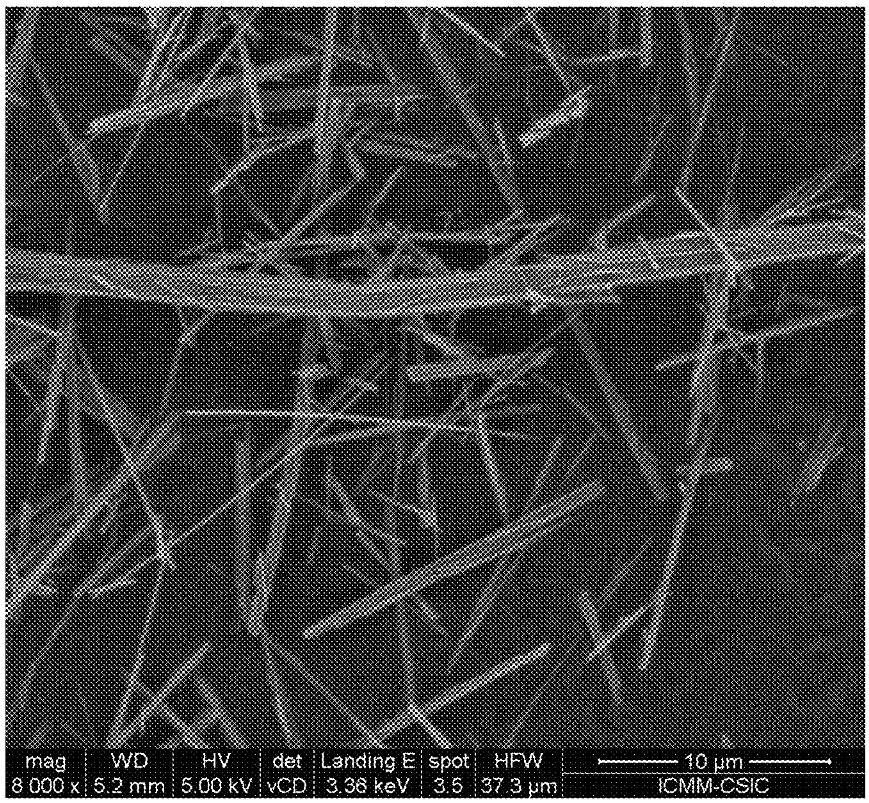
FIG. 4 is a scanning electron microscope (SEM) image of the silicate material ZEO-2 of the present invention.
Figure 5:
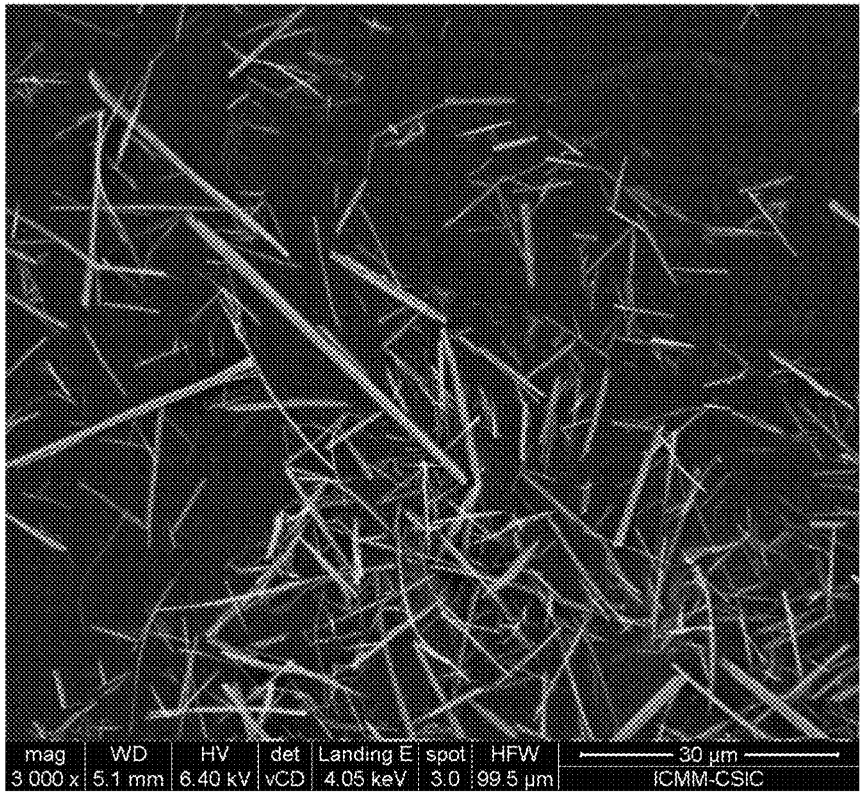
FIG. 5 is a scanning electron microscope (SEM) image of the silicate molecular sieve ZEO-3 of the present invention.

The molecular sieves ZEO-3 of Examples 3-6 were subjected to continuous rotation electron diffraction (cRED) test, and the structural analysis results showed that the ZEO-3 molecular sieve structure had monoclinic symmetry with C2/c space group, the unit cell parameters obtained after refinement of the powder X-rays with copper target (Ka) as light source (FIG. 2) were: a=21.505 (9) Å, b=21.274 (9) Å, c=14.463 (9) Å, β=108.72 (9°).

Topological analysis was performed using the crystallographic information file (CIF file) obtained after the cRED test. The topological analysis software was based on ToposPro 5.3.0.2, and the analysis process and method were based on the operation manual given on the official website of the software (see ToposPro official website: https://topospro.com/software/).

The results of analysis of the crystal structure of ZEO-3 showed that the framework structure of the molecular sieve had 11 topologically independent T atoms, 20 topologically different edges, 16 topologically different planes, and 8 topologically different structural units constituted by T atoms. The more specific topological characteristics of the framework structure of ZEO-3 molecular sieve were shown in the above Table 3.

The invention claimed is:

1. A silicate material, characterized in that the silicate material has the powder X-ray diffraction characteristics shown in the following table

| Interplanar spacing range (Å) | Relative intensity $I/I_0 \times 100$ |
|---|---|
| 16.246 ± 1.052 | vs |
| 12.282 ± 0.736 | m-s |
| 10.773 ± 0.737 | w |
| 9.706 ± 0.675 | w |
| 8.911 ± 0.671 | w |
| 8.158 ± 0.354 | mw |
| 7.476 ± 0.193 | w |
| 7.115 ± 0.101 | w |
| 6.891 ± 0.085 | w-mw |
| 6.556 ± 0.071 | w |
| 6.248 ± 0.053 | w |
| 6.136 ± 0.093 | w-mw |
| 5.786 ± 0.071 | w |
| 5.493 ± 0.063 | w-mw |
| 5.378 ± 0.061 | w-mw |
| 5.292 ± 0.037 | w |
| 5.024 ± 0.063 | w |
| 4.494 ± 0.043 | w |
| 4.771 ± 0.091 | w |
| 4.601 ± 0.039 | w |
| 4.284 ± 0.042 | w-mw |
| 4.072 ± 0.103 | vs |
| 3.914 ± 0.035 | w |
| 3.855 ± 0.027 | w |
| 3.806 ± 0.031 | w |
| 3.735 ± 0.029 | w |
| 3.642 ± 0.035 | w |
| 3.575 ± 0.028 | w-mw |
| 3.420 ± 0.040 | w-mw |
| 3.368 ± 0.022 | w-mw |
| 3.275 ± 0.031 | w |
| 3.073 ± 0.026 | w |
| 2.967 ± 0.027 | w |
| 2.833 ± 0.028 | w |
| 2.597 ± 0.020 | w |
| 2.448 ± 0.013 | w. |

2. The silicate material according to claim 1, characterized in that the crystal structure of the silicate material has a regular, long-range ordered, one-dimensional silica chain structure.

3. The silicate material according to claim 1, characterized in that the silicate material has a chemical composition $SiO_{2.2}H_{0.4}\cdot(OSDA)_y$, where OSDA is an organic template having a tetrahedral spatial configuration represented by the following general formula:

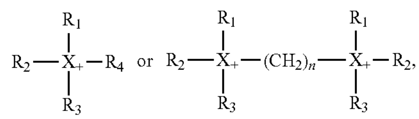

wherein $R_1$ is cyclohexyl; $R_2$ and $R_3$ are phenyl or cyclohexyl; $R_4$ is $C_{1-8}$ alkyl, X is phosphorus or nitrogen, wherein y=0.075-0.125.

4. A method for the synthesis of the silicate material according to claim 1, comprising:

step (1) mixing a silicon source, an organic template and water to obtain a mixture;

step (2) crystallizing the mixture to obtain the silicate material product;

wherein the organic template has a tetrahedral spatial configuration represented by the following general formula:

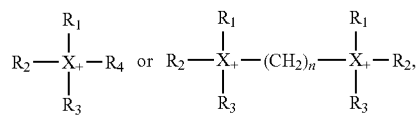

wherein $R_1$ is cyclohexyl; $R_2$ and $R_3$ are phenyl or cyclohexyl; $R_4$ is $C_{1-8}$ alkyl, X is phosphorus or nitrogen.

5. The method according to claim 4, characterized in that the organic template is any one or more selected from the following:

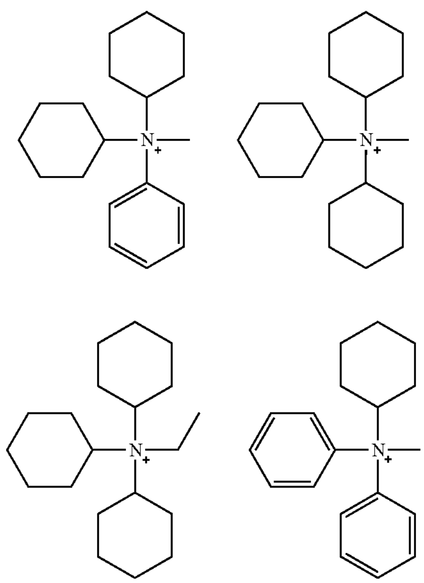

-continued

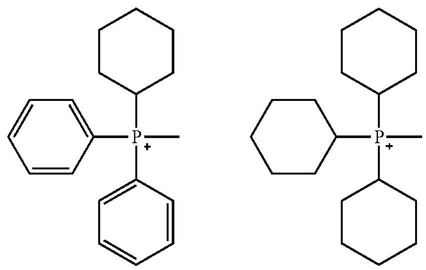

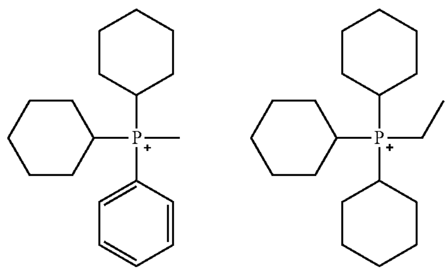

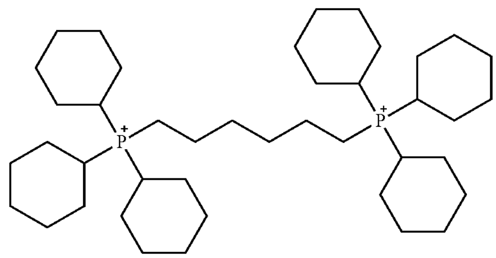

-continued

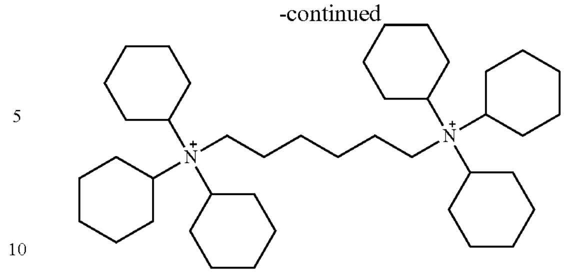

6. The method according to claim 4, characterized in that: the step (1) further comprises: stirring, the mixing the silicon source, the organic template and the water uniformly in proportion, and forming a reaction gel by the obtained mixture with a chemical composition of $rROH:SiO_2:wH_2O$, wherein R represents a positive charge group of the organic template; the corresponding value intervals of r and w are: r=0.05-5.0, w=1-100; the step (2) further comprise: placing the reaction gel under an infrared lamp or in an oven, after the removal of excess solvent, transferring the reaction gel to a stainless steel reaction kettle to react for 1-60 days, under sealed condition and at a temperature of 80-240° C., for the crystallization; and the method further comprises: (3) washing and drying the crystallized product.

7. The method according to claim 6, characterized in that in the chemical composition $rROH:SiO_2:wH_2O$ of the reaction gel, wherein the corresponding value intervals of r and w are: r=0.1-2.0, w=1-30.

8. The method according to claim 4, characterized in that the silicon source is at least one selected from the group consisting of silicic acid, silica gel, silica sol, tetraalkyl silicate and water glass.

9. The method according to claim 4, characterized in that crystallization conditions in the step (2) include: crystallization temperature of 80° C. to 240° C.; and crystallization time of 1 to 60 days.

* * * * *